Nov. 28, 1967     E. PETSCH     3,354,686

DEVICE

Filed Nov. 2, 1965     2 Sheets-Sheet 1

INVENTOR

ERNST PETSCH

Nov. 28, 1967  E. PETSCH  3,354,686
DEVICE
Filed Nov. 2, 1965  2 Sheets-Sheet 2
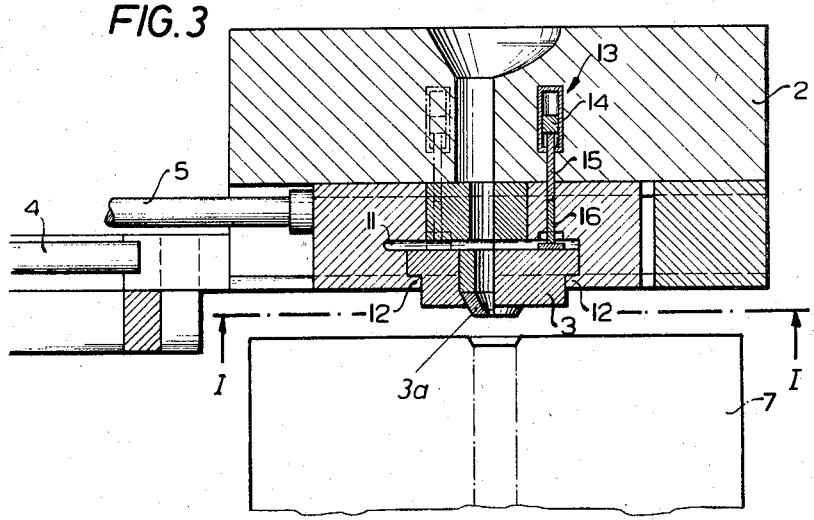
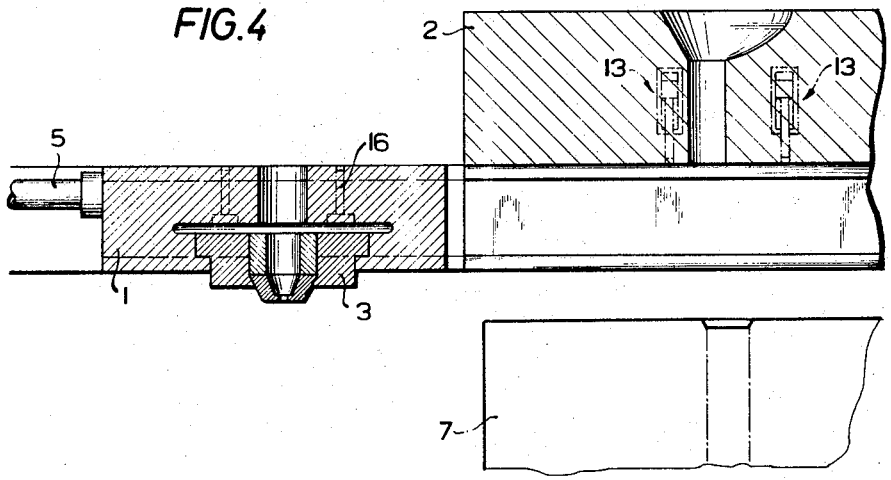
INVENTOR
ERNST PETSCH United States Patent Office 3,354,686
Patented Nov. 28, 1967

3,354,686
DEVICE
Ernst Petsch, Duisburg, Germany, assignor to Hydraulik
G.m.b.H., Duisburg, Germany
Filed Nov. 2, 1965, Ser. No. 506,043
9 Claims. (Cl. 72—263)

ABSTRACT OF THE DISCLOSURE

A hydraulic metal extrusion press includes a body portion having a discharge opening recessed within a guideway for a carrier which is movable transverse to the axis of the opening. The carrier accommodates a die holder which is mounted in a carrier such that it may be moved in a direction parallel to the discharge opening axis in order to define a slot between the discharge opening and the die to permit a cutting element such as a circular saw to be moved therethrough for the purposes of cutting away any residue. The carrier may be displaced laterally of the discharge opening of the body portion in order to permit removal or exchange of the die and the die holder.

Summary of the invention

This application relates, in general, to an extruder construction, and in particular, to a new and useful extruder including a carrier for a movable die holder with means for displacing the holder after extrusion away from the extruder opening in order to provide an access for a cutting tool to cut away the excess extruded material.

The present invention is particularly applicable to a metal extruder with a receiver which is displaceable in an axial direction in respect to the extruder device. The invention also includes an arrangement which includes means for displacing a die carrier transverse to the axis of an extruder opening and with means in the carrier for displaceably mounting the die for the purpose of severing the excess extruded material. The invention is particularly useful as a quick changing device for the dies and it makes it possible to rapidly separate the residue from the extruded part before the die after the receiver has been extracted in a known manner.

A disadvantage in the prior art devices for the separation of the residue from the extruded portion at a location before the die is that after the extruded part has been severed it must be pulled from the extruder through the die orifice in order to get the extruder clear for the next extruding operation, and this sometimes involves considerable difficulties. It has already been suggested that an end part be provided on the receiver adjoining the die with a detachable insert over the length of the receiver corresponding to the joint thickness of the pressure disk and of the residue. This insert is to be arranged on the die carrier and is liftable on the die carrier to a limited extent. Such a solution is advantageous in many respects, but the separation of the residue from the die and the pulling of the extruded part through the die is not particularly easy. However, a still later development attempted to separate the residue from the extruded part behind the die. In metal extruders with a die carrier moving transverse to the extruder axis this is readily possible if the die is carried by a die plate which can be lifted opposite to the extruding direction from the die carrier by means of a pressure drive. In such devices the piston rods of the pressure drive are sub-divided each into a part moving transversely with the die carrier and into a part arranged with the associated piston and cylinder in an arm bracket which is aligned with a supplemental part in the die carrier in its holding positions. By means of this arrangement, it is possible to separate the extruded part from the residue behind the die, but it is not possible to effect a quick change.

In the known quick changing devices, therefore, the die adheres to the residue and thus also the die clay holding it and it is still highly stressed for tension and partly also for bending during the removal of the residue from the die, particularly if a bridge die is used. The tearing away movement can therefore have an unpleasant consequence which may finally lead to the destruction of the parts of the changing device which are provided for the axial lifting movements.

In accordance with the present invention there is provided a die holder carrier which is movable transversely to the extruded opening. The carrier may be displaced away from the extruder for the purpose of changing the carrier with a movable die holder which it carries. The carrier advantageously includes means which may be operated for example, from the extruder for displacing the holder so that it may be moved away from the extruder opening after extrusion takes place. This permits access for a cutting tool to separate the excess extruded portion at a location behind the die, that is, between the die and the opening of the extruder.

Accordingly, it is an object of the invention to provide an improved extruder construction with a carrier having a movable die holder therein which may be moved transverse to the opening of extruder and which includes a movable die holder which may be displaced away from the extruder for the purpose of separating the extruded material from the extruder for cutting away the excess portion.

A further object of the invention is to provide an extruder which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 3 is a section similar to FIG. 2, but indicating the parts in a residue severing position; and FIG. 4 is a section taken on the line 4—4 with the die carrier being shown displaced out of an operative position.

Figure 1:
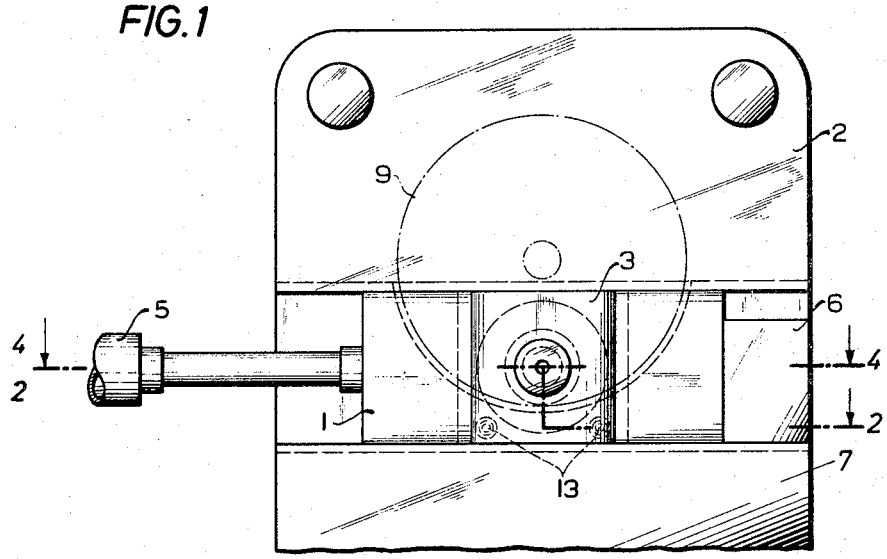
FIG. 1 is a sectional view taken along the line 1—1 of FIG. 3 of an extruder construction in accordance with the invention.

Referring to the drawings in particular, the invention embodied therein comprises a metal extruding device which includes an extruder body 2 having an extruder opening or bore 2a through which metal material to be extruded is directed.

In accordance with the invention the body 2 includes a guideway or slide 2b along which is movable a movable die holder carrier 1. The carrier 1 is arranged for movement transverse to the extruding direction and it is provided with a recess for receiving a pressure piece 8 having a bore 8a which aligns with the bore 2a during extrusion. It also carries a die generally designated 3 having a bore 3' which aligns with the bore 8a. The die 3 includes a pressure die portion 3a, a rear bearing portion 3b, and a die holder 3c.

The slide 2b is arranged alongside of a magazine 4 and a power drive connection 5, for example, a reciprocating member is connected to the carrier 1 for the purpose of displacing it along the slide and out of the slide into the magazine 4. A stop 6 is arranged at the inner end of the slideway 2b and provides a means for orienting the bores 8a and 3' in respect to the opening 2a of the extruder.

Figure 2:
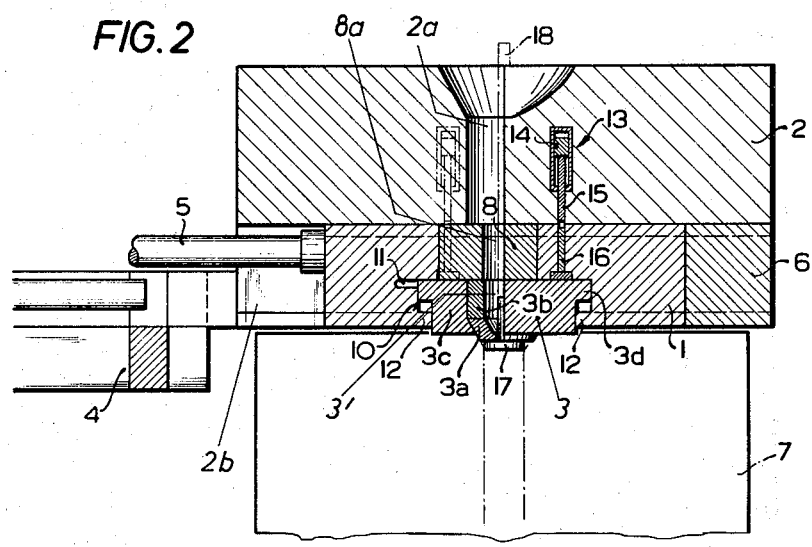
FIG. 2 is a section taken on the line 2—2 of FIG. 1.

A feature of the construction of the carrier 1 is that it includes an internal horizontally extending slot 11 terminating in an enlarged recess 10 into which is fitted the die 3. The die holder 3c includes a flanged upper portion 3d which in the operating position is spaced upwardly from a ledge portion 12. In the operating position, a receiver 7 is oriented to abut against the outer walls of the carrier 1 and to provide an opening of the receiver in alignment with bore 3' for receiving the extruded material. The receiver 7 is extracted by moving it in a direction axially away from the body 2 after the extrusion is completed. The body 2 is drilled to provide a recess for pressure cylinder 13 in which a pressure piston 14, having a piston rod portion 15, is slidable. A suitable connection is made to the cylinder 13 from a fluid pressure source (not shown) in order to displace the piston 14 in a desirable direction, that is, upwardly or downwardly. In FIG. 2 the pistons 14 are indicated in an upward position so that they do not contact a pressure rod 16 which has widened bases which rest on the flanges 3d of the die holder 3c. When fluid pressure is admitted to the top of the cylinder 13, pistons 14 are moved downwardly to cause them to bear against the flanges 3d and to move them downwardly so that the die holder 3c abuts against the abutment formed by a ledge 12 (see FIG. 3). When this occurs, the die holder 3c will be spaced from the receiver 8 and the slot 11 is big enough to provide access for a cutting tool or saw 9 which moves through the slot 11 to sever any extruded material which projects upwardly from the die 3a and the pressure piece 3b.

In the position indicated in FIG. 3 with the receiver 7 indicated displaced, and after the extruded projecting portion has been severed, the pistons 14 are permitted to move upwardly in the cylinders 13 by relieving the pressure therein. The pistons 14 act in the manner of a spring on the pressure rod 16 but they will be released when the carrier 1 is moved transversely by the drive 5 for the purpose of changing the die. In case the residue 17 is to be severed axially from the die 3, the die 3 bears on the projections 12 formed along the slideway 2b and they act as an abutment to remove this material. A feature of the construction is that because the die holder 3 is moved away from the pressure piece 8 and the opening 2a of the extruder, it is possible to sever the residue 17 from the extruded part 18 behind the die 3. After separation, and when the saw 9 has returned to its starting position, the die carrier 1 can be moved transversely into the magazine 4 by means of the drive 5, and the die 3 can be exchanged for the new one at such location.

While a specific embodiment of the invention has been shown and described in detail to illustrate the application of the inventive principles, it will be understood that the invention may be embodied otherwise without departing from such principles.

What is claimed is:

1. A metal extrusion press comprising a body portion having an extrusion discharge opening, a carrier movable adjacent said body portion alongside said opening, a pressure die having an opening therethrough adapted to be aligned with the extrusion discharge opening, said pressure die being mounted in said carrier for movement in directions parallel to said discharge opening axis, means associated with said die for displacing said die away from said discharge opening for removing any residue forming between said die and said discharge opening after extrusion, said body portions and said carrier when said die is displaced from said discharge opening together defining an access passage for a saw to move transversely to the discharge opening to cut away the residue and means for displacing said carrier to a position in which said die opening is aligned with said extrusion discharge opening and away from this position for removal and exchange of said die.

2. A metal extrusion press comprising a body portion having an extrusion discharge opening, a carrier movable adacent said body portion alongside said opening, a pressure die having an opening therethrough adapted to be aligned with the extrusion discharge opening and being mounted in said carrier for movement in directions parallel to said discharge opening axis, means associated with said die for displacing said die away from said discharge opening for removing any residue forming between said die and said discharge opening after extrusion, means for displacing said carrier to a position in which said die opening is aligned with said extrusion discharge opening and away from this position for removal and exchange of said die, said carrier having a recess for receiving said pressure die, and a carrier die holder carrying said pressure die and having a flange portion being slidable in said recess, said carrier having a flange abutment of the flange portion thereon against said abutment, said means for displacing said die including a piston member bearing against said die holder to displace said die holder in said recess.

3. An extruder according to claim 1, including a pressure piece in said die between said pressure die and said discharge opening, said pressure piece having a bore therethrough alignable with the discharge opening and with the opening in said die.

4. An extruder according to claim 1, wherein said body has a slide defined along the end thereof having said discharge opening, said carrier being movable along said slide.

5. An extruder according to claim 4, including a stop on said slide for limiting movement of said carrier to a position at which the pressure die opening therethrough aligns with said discharge opening.

6. An extruder according to claim 1, including a pressure die carrier, a pressure piece in said carrier having a bore therethrough alignable with the discharge opening, said pressure die being carried outside of said pressure piece and having a bore therein alignable with the bore of said pressure piece.

7. A metal extrusion press comprising a body portion having an extrusion discharge opening, a carrier movable adjacent said body portion alongside said opening, a pressure die having an opening therethrough adapted to be aligned with the extrusion discharge opening and being mounted in said carrier for movement in directions parallel to said discharge opening axis, means associated with said die for displacing said die away from said discharge opening for removing any residue forming between said die and said discharge opening after extrusion, means for displacing said carrier to position in which said die opening is aligned with said extrusion discharge opening and away from this position for removal and exchange of said die, and a pressure die carrier carrying said pressure die, said carrier having a recess defined therein and said die carrier being slidable in said recess, a slot defined across said recess and extending laterally therebeyond for accommodating a cutting element, said die carrier being movable beyond said slot away from said discharge opening for the purpose of permitting a cutting element to be positioned between said die carrier and said discharge opening.

8. An extruder according to claim 7, including a pressure piece having a bore defined therethrough alignable with the discharge opening and carried by said carrier.

9. An extruder according to claim 8, including a member connected to said carrier for displacing said carrier transverse to said discharge opening.

References Cited

UNITED STATES PATENTS

| | | | |
|---|---|---|---|
| 2,720,970 | 10/1955 | Roux | 72—263 |
| 2,880,867 | 4/1959 | Keck | 72—263 |
| 2,954,869 | 10/1960 | Swanson | 72—263 |
| 2,979,768 | 4/1961 | Nichols | 18—14 X |
| 3,019,894 | 2/1962 | Delcroix et al. | 72—263 |
| 3,139,183 | 6/1964 | Elkan et al. | 72—263 |
| 3,147,863 | 9/1964 | Rosenthal | 72—263 |
| 3,256,729 | 6/1966 | Rowell | 72—263 |

WILLIAM J. STEPHENSON, *Primary Examiner.*

UNITED STATES PATENT OFFICE

CERTIFICATE OF CORRECTION

Patent No. 3,354,686                          November 28, 1967

Ernst Petsch

It is hereby certified that error appears in the above numbered patent requiring correction and that the said Letters Patent should read as corrected below.

In the heading to the printed specification, between lines 5 and 6, insert the following:

Claims priority, application Germany, Nov. 10, 1964
      H 54,258

Signed and sealed this 19th day of November 1968.

(SEAL)
Attest:

Edward M. Fletcher, Jr.                        EDWARD J. BRENNER
Attesting Officer                              Commissioner of Patents